United States Patent
Moreno et al.

(10) Patent No.: US 6,539,971 B2
(45) Date of Patent: Apr. 1, 2003

(54) METHOD AND APPARATUS FOR MOUNTING SOLENOID OPERATED VALVE

(75) Inventors: Jorge A. Moreno, Auburn Hills, MI (US); Charles Chang, Troy, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/932,046

(22) Filed: Aug. 17, 2001

(65) Prior Publication Data

US 2003/0034070 A1 Feb. 20, 2003

(51) Int. Cl.[7] .............................................. F16K 51/00
(52) U.S. Cl. ........................... 137/315.03; 137/15.18; 137/315.11; 137/343; 137/625.64; 137/454.2; 137/899; 251/129.15; 251/366; 29/890.124
(58) Field of Search .................... 137/15.17, 15.18, 137/315.03, 315.11, 454.2, 343, 899, 625.64, 625.65; 251/129, 129.15, 366, 367; 74/606 R

(56) References Cited

U.S. PATENT DOCUMENTS

| | | | |
|---|---|---|---|
| 4,254,938 A | * | 3/1981 | Inada et al. ................. 251/367 |
| 4,445,528 A | * | 5/1984 | Miki et al. .............. 137/625.64 |
| 4,573,659 A | * | 3/1986 | Homes .................. 251/129.15 |
| 4,842,010 A | * | 6/1989 | Edgecomb et al. ......... 137/343 |
| 4,993,451 A | * | 2/1991 | Kremer .................... 137/454.2 |
| 5,145,149 A | * | 9/1992 | Moehle .................. 251/129.15 |
| 5,339,856 A | * | 8/1994 | Templar ................... 137/15.17 |
| 5,356,111 A | * | 10/1994 | Bottacini ............... 251/129.15 |
| 5,615,860 A | * | 4/1997 | Brehm et al. ............ 137/454.2 |
| 5,651,387 A | * | 7/1997 | Thor ..................... 137/625.64 |
| 5,845,672 A | * | 12/1998 | Reuter et al. .......... 251/129.15 |
| 6,029,703 A | * | 2/2000 | Erickson et al. ....... 251/129.15 |
| 6,170,516 B1 | * | 1/2001 | Sakata et al. ................ 137/343 |
| 6,273,122 B1 | * | 8/2001 | Schudt et al. .......... 137/315.03 |
| 6,343,621 B1 | * | 2/2002 | Holmes et al. ......... 137/625.64 |
| 6,378,557 B2 | * | 4/2002 | Kawamura et al. ..... 137/625.64 |
| 6,457,484 B1 | * | 10/2002 | Najmolhoda ............. 137/15.18 |

* cited by examiner

*Primary Examiner*—George L. Walton
(74) *Attorney, Agent, or Firm*—Roger A. Johnston

(57) ABSTRACT

A technique of assembling a solenoid operated valve to a hydraulic manifold in which the manifold has provided thereon undercut stanchions disposed on opposite sides of a cavity communicating with fluid valving passages. A U-shaped bracket with a central aperture is received over the solenoid and a first pair of tabs which engage lugs disposed respectively on opposite sides of the valve body function to prevent relative rotation between the bracket and valve. The bracket has a pair of oppositely extending resiliently deflectable spring arms each having a pair of second tabs thereon; and, the spring arms are deflected on the stanchions upon user insertion of the valve body into the cavity. The spring arms resiliently engage the undercuts to prevent removal of the valve, and the second tabs engage the sides of the stanchions to prevent relative rotation of the bracket and valve.

13 Claims, 2 Drawing Sheets

METHOD AND APPARATUS FOR MOUNTING SOLENOID OPERATED VALVE

BACKGROUND OF THE INVENTION

The present invention relates to the mounting of electrically operated valves employed for controlling flow of hydraulic fluid in a fluid operated system and particularly a system of the type where the valve assembly has a body portion containing the fluid inlet and outlet ports thereon inserted into a receptacle or block having corresponding ports for connecting to the fluid operated system. The invention relates more particularly to solenoid operated valves of the type having the valve body inserted into a block or manifold for controlling flow of hydraulic fluid in an automatically shifted power transmission.

In automatic power transmissions employed in current production of some vehicles such as passenger cars and light trucks, the shifting of the automatic transmission is controlled by a plurality of valves mounted on a manifold with each valve connected to a fluid control circuit for operating one of the hydraulic shifting actuators employed in the transmission.

Heretofore, such solenoid operated transmission shift control valves have been mounted to the hydraulic manifold in the transmission by means of separate fasteners, such as bolts, passing through retaining brackets received over the individual solenoid operated valves. This arrangement has provided sufficient retention of the valve on the manifold; however, the arrangement has required the necessity of providing separate fasteners for the assembly process and has required additional tools to engage the bolts and to provide the appropriate bolt installation torque. Thus, the operation of installing solenoid operating shift control valves on an automatic transmission has been relatively costly for high-volume, automotive mass-production and it has been desired to provide a simplified way or means of mounting the valves and reducing the assembly time and cost.

BRIEF SUMMARY OF THE INVENTION

The present invention provides a solution to the above-described problem of providing a simple and relatively low cost way or means of attaching a solenoid operated hydraulic valve to a manifold or block for controlling flow of hydraulic fluid in passages within the manifold. The present invention utilizes undercut attachment surfaces disposed on provided opposite sides of the cavity in the block into which the valve body is inserted. A generally U-shaped resilient bracket is received over the solenoid with the legs of the U-shaped resiliently engaging the undercut in the manifold by snap action. The U-shaped bracket has tabs formed on the portion engaging the valve to orient the valve body with respect to ports in the manifold; and, a second pair of tabs engages the sides of the undercuts and prevents rotation of the valve once installed on the manifold.

DETAILED DESCRIPTION OF THE INVENTION

Figure 1:
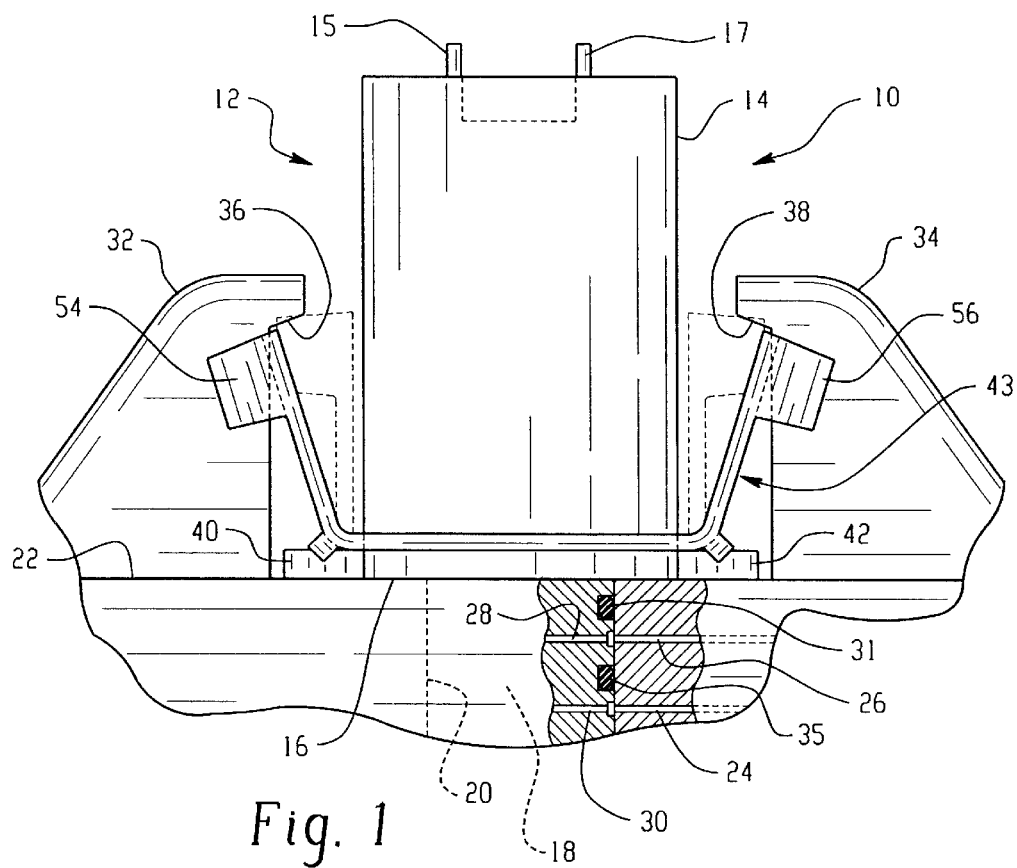
FIG. 1 is an elevational view of an assembly of a solenoid valve installed in a valving block embodying the present invention.
Figure 2:
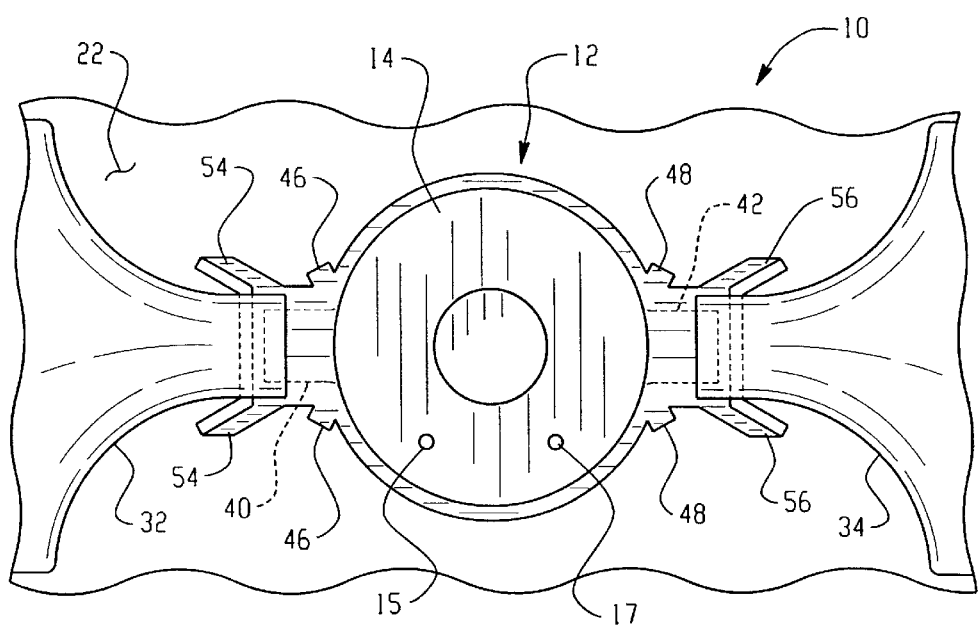
FIG. 2 is a top view of the assembly of FIG. 7.

Referring to FIGS. 1 and 2, the assembly of the present invention is indicated generally at 10 and includes a solenoid operated valve indicated generally at 12 having a solenoid 14 attached to a valve body 16 which has a lower portion 18 extending downwardly therefrom which is received in a valving cavity 20 formed in a manifold or block 22.

The manifold 22 has a plurality of hydraulic valving passages 24, 26 formed therein which communicate with the valving cavity 20 and are adapted for connection to hydraulic components (not shown) disposed remotely in a fluid operated system.

The valve body lower portion 18 has formed therein a fluid port 28 which is disposed for communication with the passage 26 in the manifold; and, a second fluid port 30 spaced from the port 28 and disposed to communicate with the passage 24 in the manifold. It will be understood that fluid flow between valving passages 28, 30 in the valve body is controlled by a moveable valve member such as a spool (not shown) operative within the valve 12 in a manner well know to those skilled in the art of solenoid operated valves.

The manifold 22 has a pair of stanchions or upright portions 32, 34 provided thereon disposed respectively on opposite sides of the valving cavity 20 and in generally aligned relationship. Preferably, stanchions 32, 34 are integrally formed with manifold 22. Each of the uprights or stanchions 32, 34 has formed therein an undercut denoted respectively 36, 38 for attachment purposes as will hereinafter be described.

The lower portion of the valve 18 is sealed in the cavity 20 above valve passage 28 by a suitable seal ring 31 received in a groove formed in the outer periphery of the lower portion 18. Similarly, a second seal ring 35 is provided below the port 28 to isolate the port 24 in the manifold from the passage 26 in the manifold; and, the seal ring 35 is disposed between the valve passages 28 and 30.

Figure 3:
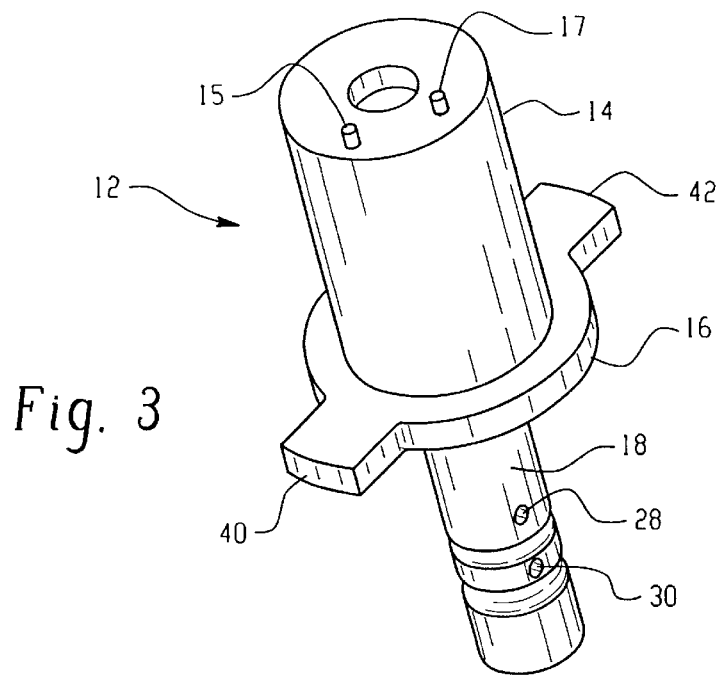
FIG. 3 is an axonometric view of the solenoid valve of FIG. 1.

The body of the valve assembly 12 has a pair of oppositely disposed projections or lugs 40, 42 extending outwardly from the upper portion thereof as shown in FIGS. 1 and 3 in solid outline and in dashed outline in FIG. 2.

Figure 4:
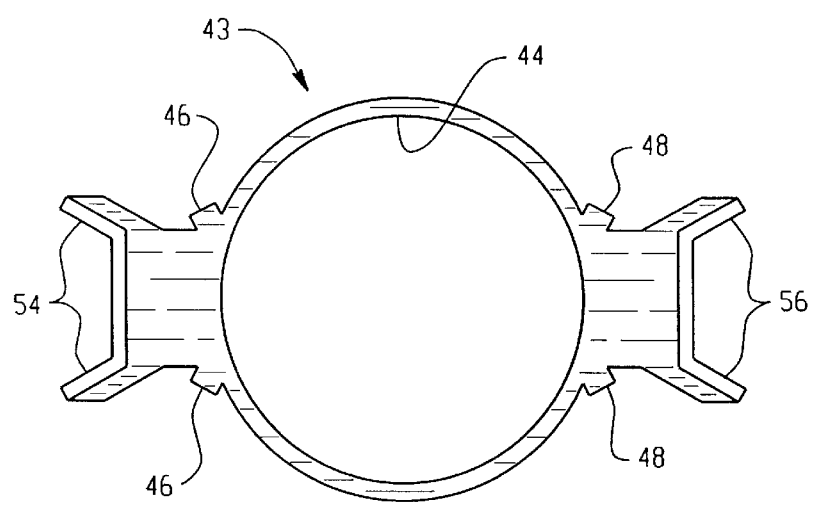
FIG. 4 is a top view of the mounting bracket employed in FIG. 1.
Figure 5:
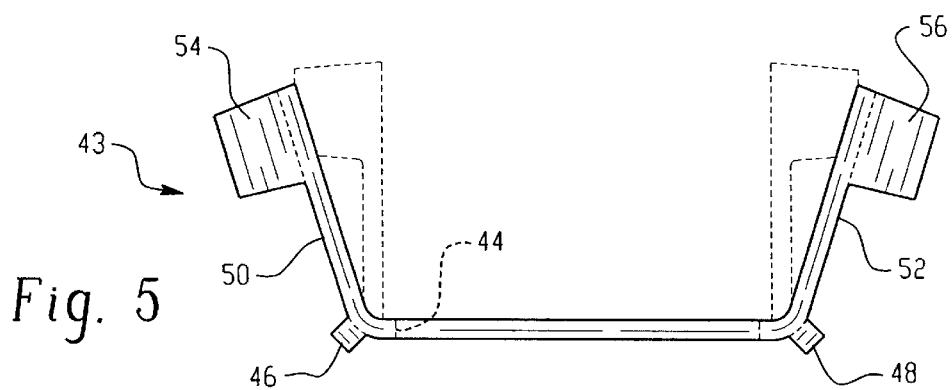
FIG. 5 is an elevational view of the bracket of FIG. 4.

Referring to FIGS. 4 and 5, the mounting bracket indicated generally at 43 is shown in its formed condition prior to assembly and has a generally cup-shaped configuration in elevation view shown in FIG. 5. The present invention preferably employs a bracket which may be stamped from a unitary blank of sheet stock and thus minimizes the fabrication costs of the mounting bracket.

The central portion of the bracket 43 has formed therethrough an aperture 44 which is received over the solenoid 14 in free-sliding engagement but sized and configured such that the undersurface of the bracket registers against the upper surface of the valve body 16.

The bracket 43 has formed thereon, on opposite sides of the aperture 44, two pairs of mounting tabs extending downwardly from the bracket as denoted by reference numerals 46, 48. The tabs 46, 48 are spaced apart a distance sufficient to enable each pair of the tabs to extend downwardly over the sides of one of lugs 40, 42 provided on the valve body to align the bracket 43 on the valve body and prevent relative rotation therebetween.

The bracket 43 has, extending outwardly in opposite directions from each of the pairs of tabs 46, 48, a resiliently deflectable spring-arm or extension respectively 50, 52 each of which has at the outward end thereof a second pair of tabs 54, 56 respectively formed thereon and extending generally downwardly therefrom in spaced apart relationship. The pairs of tabs 54, 56 are spaced so as to be received over the sides of stanchions 32, 34 respectively. The arms 50, 52 are configured and sized in length so that upon compression together of arms 50, 52 and assembly of the bracket over the solenoid 14 the arms 50, 52 spring outwardly into and fully recess in the undercuts 36, 38 and prevent removal of the bracket and valve. The tabs 54, 56 engage the sides of the stanchions 32, 34 and prevent relative rotation of the bracket 43 on the manifold and removal of the bracket.

At assembly, the valve 12 has the lower portion 18 thereof with seal rings 31, 35 thereon inserted into the cavity 18 and the manifold 22 with the undersurface of the upper portion 16 of the valve body registering against the upper surface of the manifold 22.

Bracket 43 is placed in position such that aperture 44 slips over the solenoid 14 and the arms 50, 52 of the bracket are deflected inwardly or compressed by camming against the edges of stanchions 32, 34 when moved by the installer to the position shown in dashed outline in FIG. 5 and permits the bracket to be moved downwardly until the undersurface thereof registers against the upper surface of the valve body 16. The compression of the arms 50, 52 is then released and the arms snap outwardly to the position shown in solid outline in FIG. 1 and FIG. 2. The bracket thus secures the valve vertically in the cavity and rotationally by the engagement of tabs 54, 56 with the stanchions 32, 34 and by the engagement of the tabs 46, 48 with the lugs 40, 42 on the valve body.

The present invention thus provides a simple and low-cost mounting bracket for a solenoid operated valve for installation on a manifold which enables the user to secure the valve to the manifold without separate fasteners or the need for tools to secure the fasteners.

Although the invention has hereinabove been described with respect to the illustrated embodiments, it will be understood that the invention is capable of modification and variation and is limited only by the following claims.

What is claimed is:

1. A method of assembling an electrically operated valve to a valving block comprising:
  (a) providing a valving block having a cavity therein with fluid passages thereto and first and second valve retaining surfaces disposed on opposite sides of the cavity;
  (b) providing a valve body with a pair of mounting lugs extending from opposite sides of the valve and a mounting portion with inlet and outlet ports;
  (c) providing a resilient mounting clip with a first set of tabs adapted for engaging said lugs and a second set of tabs adapted for engaging said retaining surfaces;
  (d) inserting the mounting portion of the valve into said cavity;
  (e) disposing said clip over said valve and engaging said first set of tabs with said lugs thereby orienting the valve on said valving block for preventing rotation thereof and subsequently resiliently engaging said second set of tabs with said retaining surfaces for securing said valve on said valving block.

2. The method defined in claim 1, wherein the steps of providing a mounting clip and disposing the clip over the valve include providing an aperture in the clip and sliding the aperture over a solenoid on the valve.

3. The method defined in claim 1, wherein the step of providing a clip includes stamping said clip from a unitary blank.

4. The method defined in claim 1, wherein the step of providing a pair of valve retaining surfaces includes providing a pair of stanchions.

5. The method defined in claim 1, wherein the step of providing a pair of valve retaining surfaces includes providing a pair of stanchions and undercutting said stanchions.

6. The method defined in claim 1, wherein the step of providing a pair of valve retaining surfaces includes undercutting portions of the valving block.

7. The method defined in claim 1, wherein the step of resiliently engaging said second set of tabs with said retaining surfaces includes providing undercuts in the valving block and engaging said second set of tab in the undercuts.

8. The method defined in claim 1, wherein the step of providing a resilient mounting clip includes stamping said clip from a blank of sheet stock.

9. An electrically operated valve and valving manifold assembly comprising:
  (a) a valving manifold having a cavity with a plurality of fluid passages thereto for fluid communication therewith and the manifold has a pair of retaining surfaces disposed respectively on opposite sides of said cavity;
  (b) an electrically operated valve with a valve body having a first and second portion with an inlet and outlet formed in said first portion and inserted in said cavity and communicating the inlet and outlet with said plurality of fluid passages, said body having a pair of mounting lugs disposed on opposite sides of a second portion of said valve body;
  (c) a resilient clip having a pair of tabs for initially engaging said valve body mounting lugs for orienting said clip on said valve for preventing rotation thereof, and a pair of arms each resiliently subsequently engaging one of said valving manifold retaining surfaces for orienting and retaining said valve body on said manifold.

10. The assembly defined in claim 9, wherein said valving manifold retaining surfaces comprise a pair of undercuts.

11. The assembly defined in claim 9, wherein said clip comprises a unitary piece of sheet stock.

12. The assembly defined in claim 9, wherein said clip has a generally U shaped configuration.

13. The assembly defined in claim 9, wherein said valve includes a solenoid actuator and said clip has an aperture therein to be received over said solenoid actuator.

\* \* \* \* \*